US009626738B2

(12) United States Patent
Tanaka

(10) Patent No.: US 9,626,738 B2
(45) Date of Patent: Apr. 18, 2017

(54) IMAGE PROCESSING APPARATUS, IMAGE PROCESSING METHOD, AND STORAGE MEDIUM

(71) Applicant: FUJI XEROX CO., LTD., Minato-ku, Tokyo (JP)

(72) Inventor: Eiichi Tanaka, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 134 days.

(21) Appl. No.: 14/482,577

(22) Filed: Sep. 10, 2014

(65) Prior Publication Data

US 2015/0254869 A1    Sep. 10, 2015

(30) Foreign Application Priority Data

Mar. 5, 2014    (JP) .................................. 2014-042304

(51) Int. Cl.
*G06T 3/00*     (2006.01)
*G06K 9/32*     (2006.01)
*G06K 9/00*     (2006.01)

(52) U.S. Cl.
CPC ........ *G06T 3/0006* (2013.01); *G06K 9/00449* (2013.01); *G06K 9/3275* (2013.01)

(58) Field of Classification Search
CPC ......... G06K 9/00442–9/00483; G06K 9/3275; G06T 3/0075; G06T 3/0006; G06T 7/0095
See application file for complete search history.

(56) References Cited

U.S. PATENT DOCUMENTS

| 4,949,392 A * | 8/1990 | Barski ................ G06K 9/00449 382/170 |
| 2003/0130992 A1* | 7/2003 | Tyan ................ G06F 17/30253 |
| 2007/0206877 A1* | 9/2007 | Wu ...................... G06K 9/3283 382/275 |
| 2009/0245652 A1* | 10/2009 | Bastos dos Santos ............... G06K 9/00449 382/203 |
| 2012/0045131 A1* | 2/2012 | He ...................... G06K 9/00449 382/190 |
| 2013/0121595 A1* | 5/2013 | Kawatani ................. G06K 9/32 382/199 |
| 2013/0294697 A1* | 11/2013 | Nepomniachtchi .. G06K 9/6211 382/192 |

FOREIGN PATENT DOCUMENTS

| JP | 10-207981 A | 8/1998 |
| JP | 11-353412 A | 12/1999 |
| JP | 2001-229341 A | 8/2001 |

* cited by examiner

*Primary Examiner* — Sean Motsinger
(74) *Attorney, Agent, or Firm* — Sughrue Mion, PLLC

(57) ABSTRACT

An image processing apparatus includes a detection unit that detects segments from a first image; a selection unit that selects pairs of segments formed of a predetermined number of segments counted from a higher priority in an order of length among the detected segments and segments in a second image, the second image being a model of the first image; and a calculation unit that calculates distortion of the first image with respect to the second image by using the pairs of segments.

10 Claims, 12 Drawing Sheets

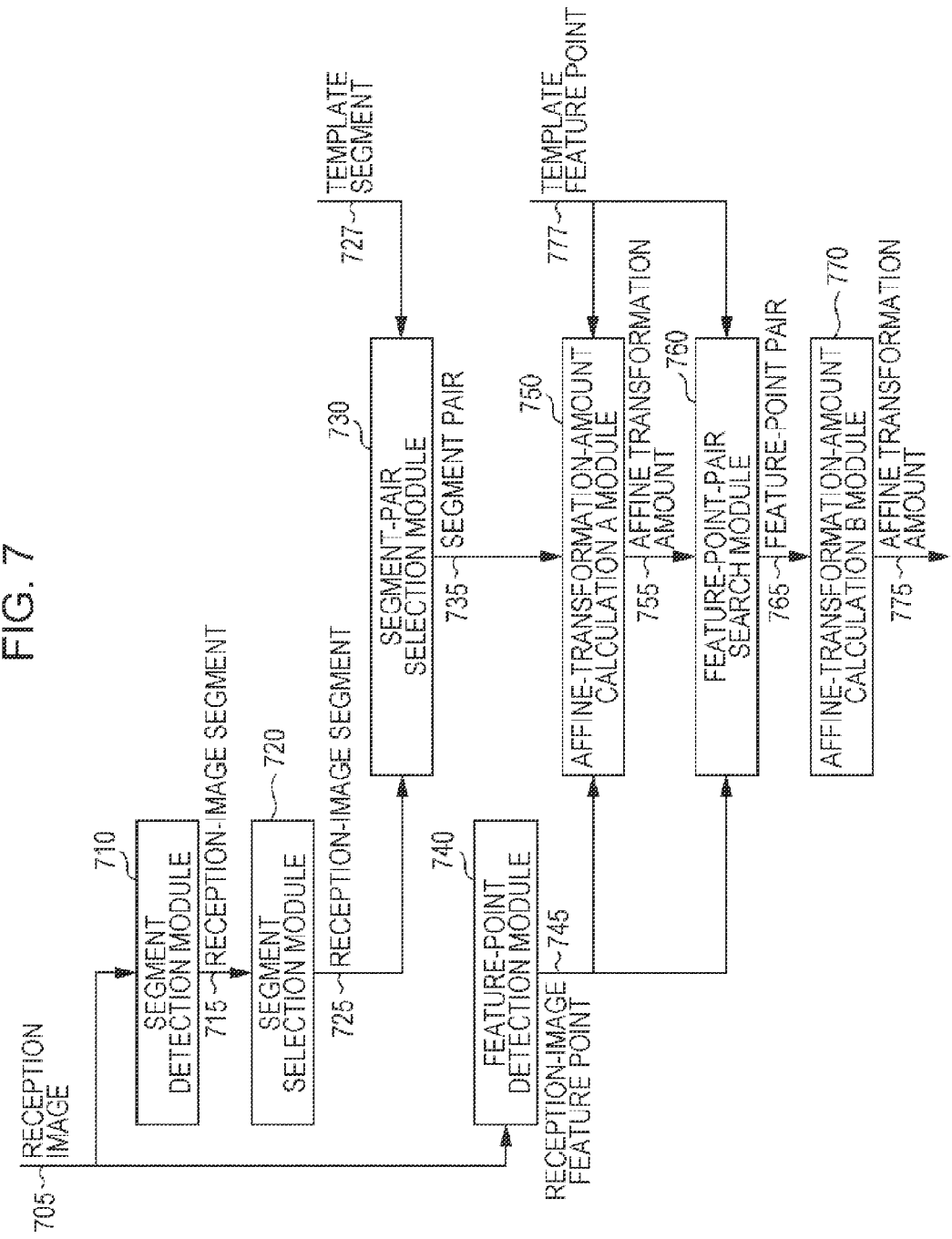

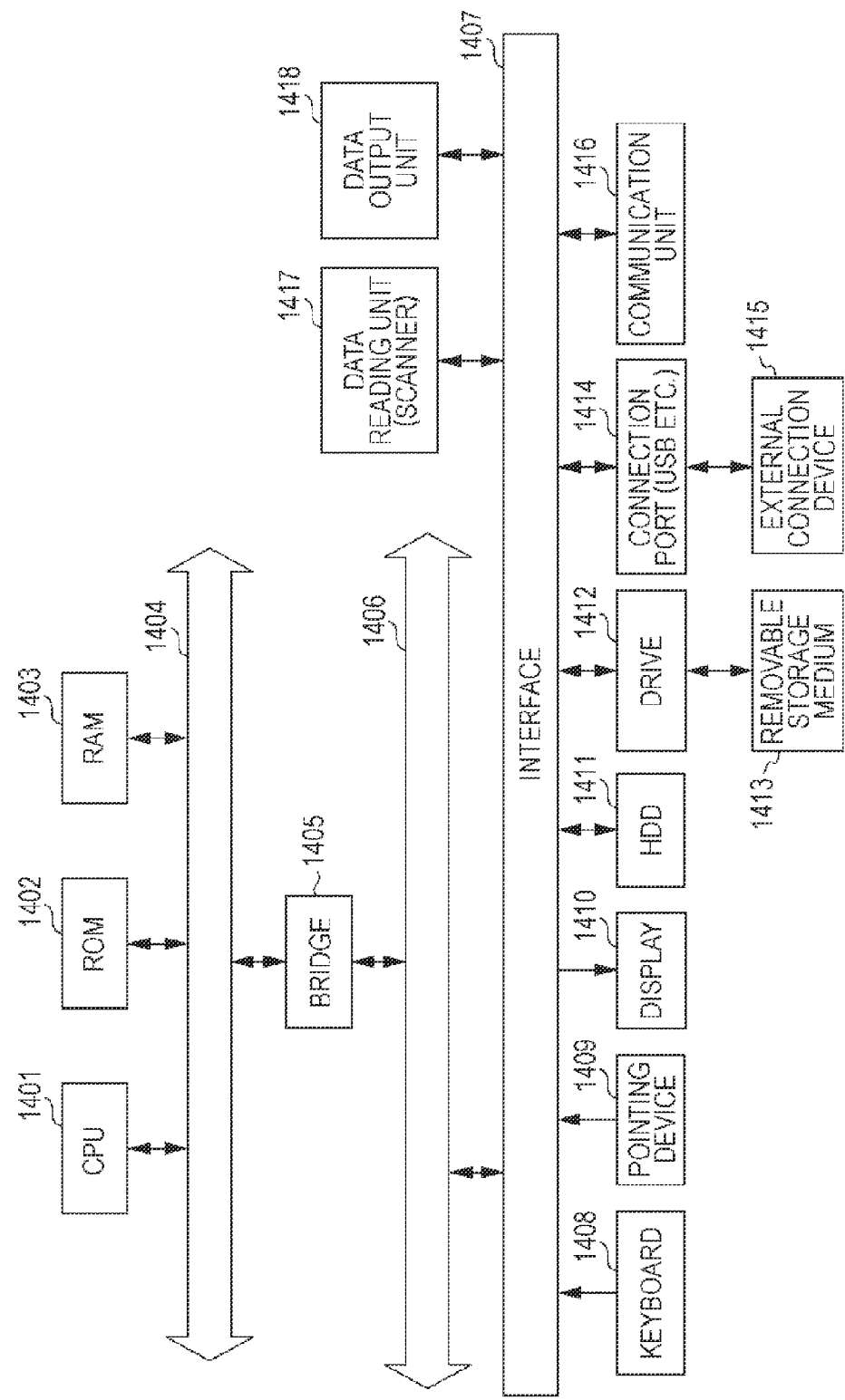

IMAGE PROCESSING APPARATUS, IMAGE PROCESSING METHOD, AND STORAGE MEDIUM

CROSS-REFERENCE TO RELATED APPLICATIONS

This application is based on and claims priority under 35 USC 119 from Japanese Patent Application No. 2014-042304 filed Mar. 5, 2014.

BACKGROUND

The present invention relates to an image processing apparatus, an image processing method, and a storage medium.

SUMMARY

According to an aspect of the invention, there is provided an image processing apparatus including a detection unit that detects segments from a first image; a selection unit that selects pairs of segments formed of a predetermined number of segments counted from a higher priority in an order of length among the detected segments and segments in a second image, the second image being a model of the first image; and a calculation unit that calculates distortion of the first image with respect to the second image by using the pairs of segments.

BRIEF DESCRIPTION OF THE DRAWINGS

Exemplary embodiments of the present invention will be described in detail based on the following figures, wherein:

FIG. 7 is a conceptual module configuration diagram of a configuration example of a first exemplary embodiment;

FIG. 14 is a block diagram showing a hardware configuration example of a computer that implements an exemplary embodiment.

DETAILED DESCRIPTION

First, before an exemplary embodiment is described, an image processing apparatus using a precondition of the exemplary embodiment or using the exemplary embodiment is described.

There is a technology relating to matching processing between a document having a character and the like written thereon and a model of the document (hereinafter, also called template, which is a document in a state before a character is written). For example, a document may be a form. In particular, the technology belongs to a technology of calculating correction amounts of misregistration, rotation, and distortion between a scanned written form and predetermined layout information.

Hereinafter, an image of the form after scanning (which is a concept including taking an image, the same being applied to the following description) is called reception image.

Also, information of a region, which is a subject of recognition for a character (which is a concept including a mark such as a checkmark, the same being applied to the following description) of the form, is called layout information. Also, an image, in which a frame line and the like that indicates the layout information is drawn, serves as a template image. The template image is, for example, an image of a non-written form. It is assumed that a distortion amount between the layout information and the template image is zero or a known value. Also, it is assumed that the template image corresponding to the reception image is known.

The reception image is misregistered, rotated, and distorted with respect to the layout information when the template image is printed or written information is scanned. Hereinafter, the amounts of misregistration, rotation, and distortion are collectively called distortion amount. It is assumed that the distortion amount in this exemplary embodiment is expressed by an affine transformation amount of the image.

The affine transformation of the image is expressed by Expression (1). In Expression 1, $(x', Y')^T$ represents coordinates before the transformation, and $(x, y)^T$ represents coordinates after the transformation. The affine transformation of the image includes translation, rotation, and enlargement/reduction, and is formed of six parameters (a, b, c, d, e, f).

$$\begin{pmatrix} x \\ y \end{pmatrix} = \begin{pmatrix} a & b \\ c & d \end{pmatrix} \begin{pmatrix} x' \\ y' \end{pmatrix} + \begin{pmatrix} e \\ f \end{pmatrix} \qquad (1)$$

Figure 2:
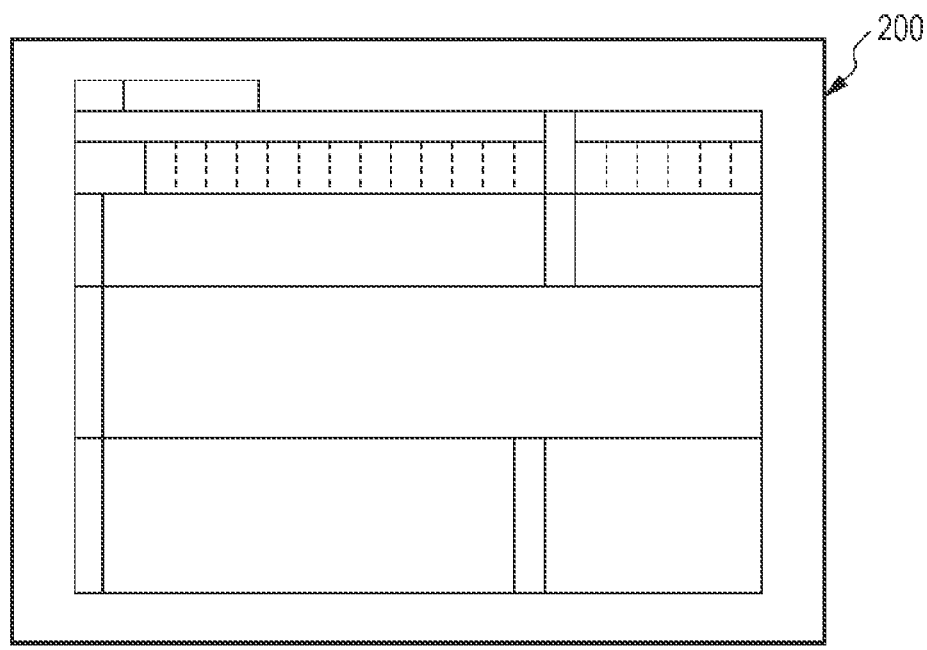
FIG. 2 is an explanatory view showing an example relating to form processing.

In operation of the form, the layout for the writing region of characters and the attribute of information thereof is previously designed, and the template image, in which the layout is indicated by frame lines and the like, is created. Then, a paper medium or the like on which the template image is printed is presented to a writing person, the writing person writes information according to the layout, and the written image is scanned. Further, the written image serves as the reception image, the written content is recognized according to the layout information, and the information is attempted to be collected. FIG. 2 shows an example of a template image 200. Also, FIG. 3 shows an example of a written reception image 300.

Figure 3:
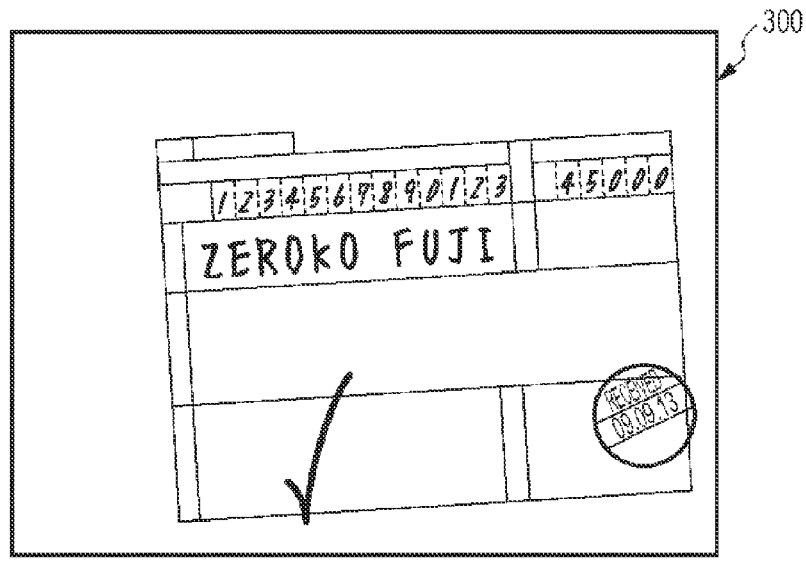
FIG. 3 is an explanatory view showing an example relating to the form processing.
Figure 4:
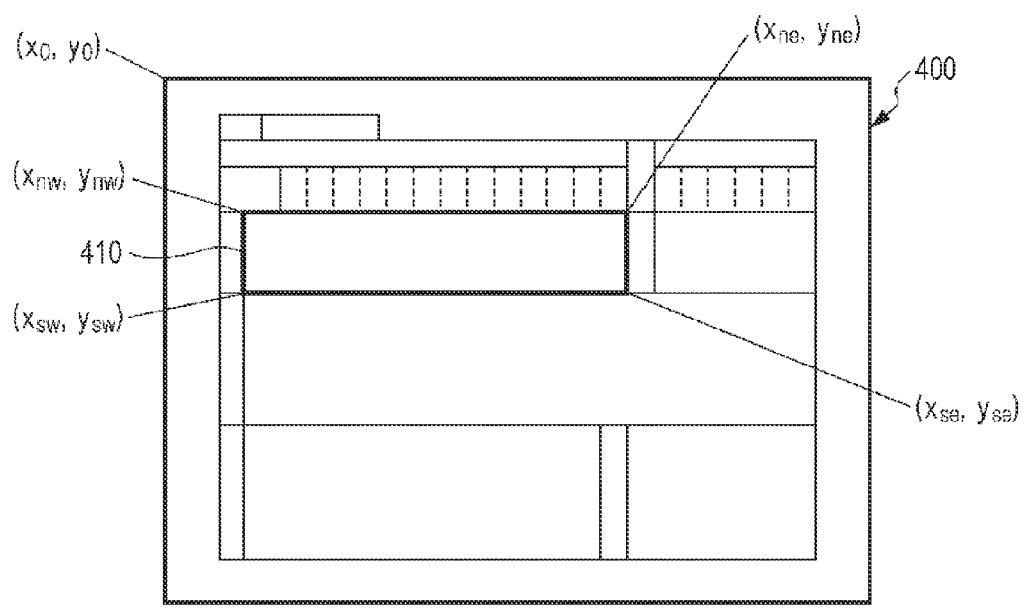
FIG. 4 is an explanatory view showing an example relating to the form processing.
Figure 5:
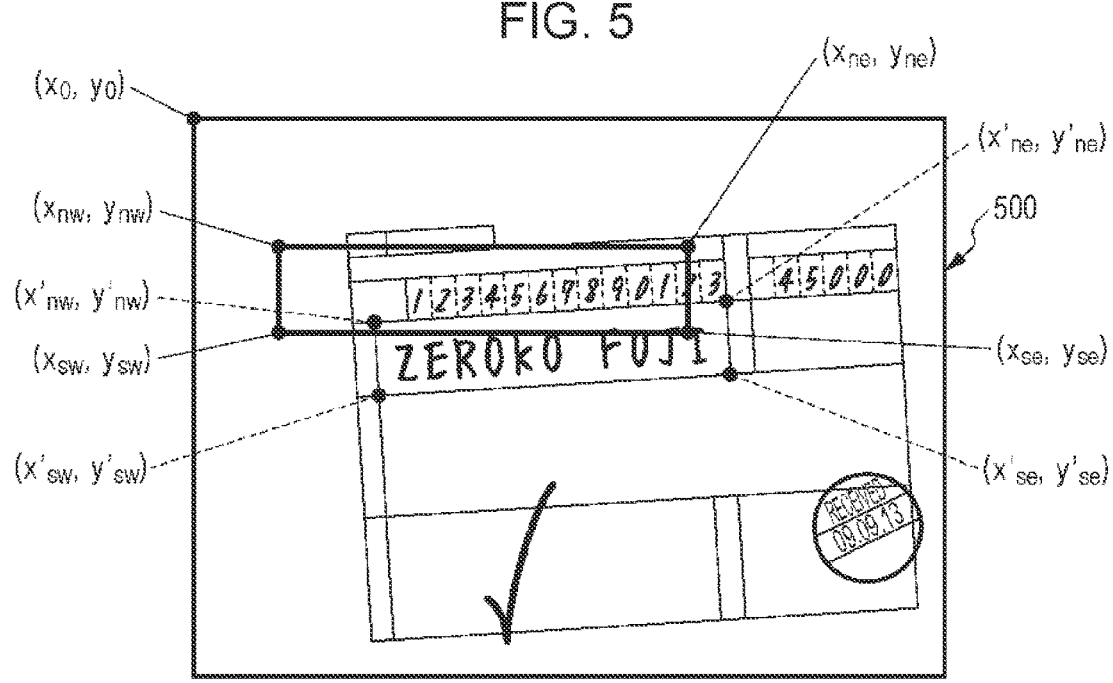
FIG. 5 is an explanatory view showing an example relating to the form processing.

In this process, distortion, such as misregistration and rotation, is generated between the reception image and the layout information as shown in the example of FIG. 3 particularly due to mechanical processing of printing and scanning (processing such as paper feeding). To collect correct information, the distortion amount has to be calculated and corrected. Examples of FIGS. 4 and 5 show this state. The example shown in FIG. 4 is layout information 400 associated with the template image 200 shown in the example of FIG. 2. For easier understanding, only designation of one region (subject region 410) is illustrated; however, plural regions may be provided. Assuming that the origin is the upper left corner $(x_0, y_0)$, information at a position surrounded by a quadrangular region $(X_{nw}, y_{nw})$, $(x_{ne}, y_{ne})$, $(x_{sw}, y_{sw})$, and $(x_{se}, y_{se})$, which is the subject region 410, is attempted to be acquired. However, as the result of distortion, like a superposed image 500 of the written reception image and the layout information shown in the example of FIG. 5, the position of the quadrangular region in the reception image 300 becomes $(x'_{nw}, y'_{nw})$, $(x'_{ne}, y'_{ne})$, $(x'_{sw}, y'_{sw})$, and $(x'_{se}, y'_{se})$ and does not meet the position of the layout information. Hence, the affine transformation amount of distortion is estimated, and the layout information or the reception image is corrected by Expression (1), to acquire information of a desirable position. With the existing technology, the distortion amount is calculated based on a characteristic figure common to the template image and the reception image, such as the frame lines, or end points or intersections of the frame lines. For example, the translation amount is calculated from a pair of corresponding segments. Also, the affine transformation amount is calculated from pairs of corresponding feature points. The feature points are, for example, intersections or end points of segments, or a corner of a quadrangle.

To calculate the affine transformation amount, pairs (at least three pairs) of feature points of the template image and the reception image are required. However, in general, the pairs of feature points of the template image and the reception image are unknown. The number of candidates is very large in the affine transformation range. If all combinations are verified, an extremely long processing time is required.

Figure 6:
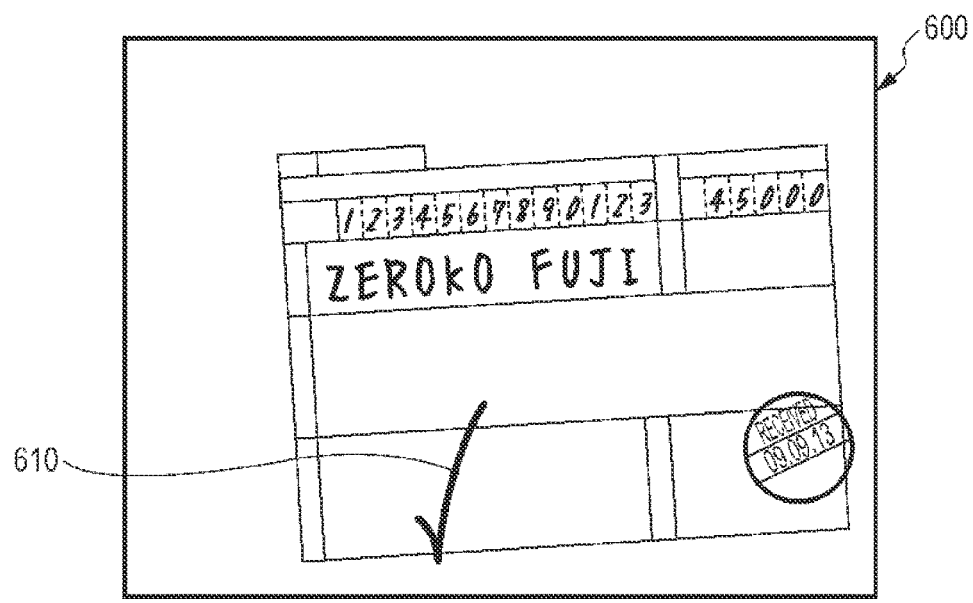
FIG. 6 is an explanatory view showing an example relating to the form processing.

To address this problem, there is an existing technology using the logical structures of the layout information and the reception image. However, in the actual environment, a segment or a feature point detected from the reception image may be incorrectly extracted or missed. Hence, the logical structures may not meet each other. FIG. 6 shows an example, in which a segment is incorrectly detected. In this example, like a segment 610 in a reception image 600, a large checkmark is present, and the checkmark is detected as a segment in a layout of incorrect detection.

Examples of various exemplary embodiments for implementing the invention will be described below with reference to the drawings.

Figure 1:
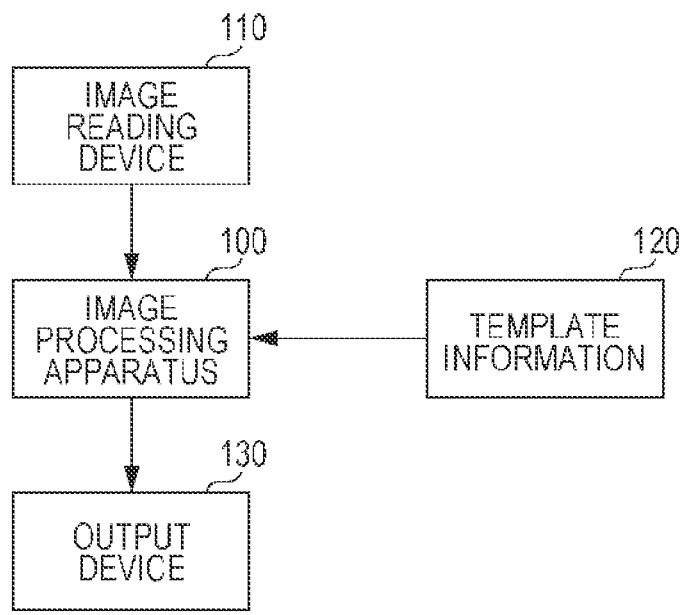
FIG. 1 is a conceptual module configuration diagram of a configuration example of an exemplary embodiment.

FIG. 1 is a conceptual module configuration diagram of a configuration example for implementing any of exemplary embodiments (first to sixth exemplary embodiments described below).

It is to be noted that a module is a part, such as software (computer program) or hardware, which may be generally logically separated. Hence, a module in the exemplary embodiment indicates not only a module of a computer program, but also a module of a hardware configuration. Therefore, the exemplary embodiment is described also as a computer program that is caused to function as a module (a program that causes a computer to execute a procedure, a program that causes a computer to function as a unit, a program that causes a computer to implement a function), a system, and a method. For the convenience of description, "store," "cause . . . to store," and other equivalent wording are used. If an exemplary embodiment is a computer program, the wording intends to "cause a memory to store," or "control a memory to store." Also, modules may correspond to functions by a one-to-one correspondence. In actual mounting, a single module may be formed of a single program, plural modules may be formed of a single program, or a single module may be formed of plural programs. Also, plural modules may be executed by a single computer, or a single module may be executed by plural computers in distributed or parallel environments. A single module may include other module. Also, hereinafter, "connection" is used for physical connection and logical connection (transmission/reception of data, instruction, reference relationship between data). "Predetermined" represents being determined prior to subject processing, and includes being determined before processing of the exemplary embodiment is started, and being determined in accordance with the current state and condition or previous state and condition even after the processing of the exemplary embodiment is started as long as the timing is before the subject processing. If plural "predetermined values" are present, the values may be different, or at least two values may be the same (of course, all values may be the same). Also, description "execute B if A" is used in a sense of "determine whether A or not, and execute B if A," unless otherwise the determination of whether A or not is not required.

Also, a system or an apparatus is formed by connecting plural computers, plural units of hardware, plural devices, etc., through a communication portion such as a network (including communication connection by a one-to-one correspondence) etc., and includes a case implemented by a single computer, a single unit of hardware, a single device, etc. An "apparatus" and a "system" are used as synonymous words. Of course, the "system" does not include a social "mechanism" (social system) that is merely a human made rule.

Also, subject information is read from a memory, processing is executed on the subject information, and then the processing result is written in the memory every processing of each module or every plural processing if the plural processing are executed in a module. Hence, the description for reading the information from the memory before the processing and writing the information in the memory after the processing may be occasionally omitted. The memory in this case may include a hard disk, a random access memory (RAM), an external storage medium, a memory through a communication line, and a resistor in a central processing unit (CPU).

An image processing apparatus 100 according to an exemplary embodiment calculates distortion of a first image with respect to a second image, and is connected with an image reading device 110, template information 120, and an output device 130 as shown in the example of FIG. 1.

The image reading device 110 is connected with the image processing apparatus 100. The image reading device 110 has a function of reading an image in which a character and the like is written in a template. For example, reading an image includes reading an image by a scanner, a camera, or the like; receiving an image from an external device through a communication line, for example, by a facsimile; and reading an image stored in a hard disk (included in a computer, or connected through a network). The image may be a binary image, or a multivalued image (including a color image). An image to be received may be one image or plural images. Also, the content of the image is, for example, a document such as a form used for business, and has a template. For example, a document includes a table, a frame line, an underline, a crossmark, etc., and information relating to the table etc. serves as template information. A document including a table is described below as an example.

The template information 120 is connected with the image processing apparatus 100. The template information 120 gives information relating to a template (for example, template segment 727, template feature point 777, template image 905, etc.) to the image processing apparatus 100.

The image processing apparatus 100 includes first to sixth exemplary embodiments which will be described later. The overview of processing of the image processing apparatus 100 is described. The processing is narrowing candidates of detected frame lines based on the length. For example, the processing handles a large distortion amount in a practical processing time. A processing flow example of this exemplary embodiment is described below.

Step 1: detect frame lines of a template image.

Step 2: detect frame lines of a reception image.

Step 3: select frame lines of the reception image by a number N counted in the order from a longer frame line.

Step 4: select frame lines of the template image by a number M respectively for the N segments selected as described above, and create pairs of the segments of the template image and the segments of the reception image.

Step 5: further select two pairs from the NM pairs of the segments of the reception image and the template image created as described above, and calculate an affine transformation amount.

Step 6: select an optimal affine transformation amount from N(N−1)M(M−1) affine transformation amounts created as described above.

Step 7: associate feature points of the template image and the reception image by using the affine transformation amount selected as described above.

Step 8: obtain an affine transformation amount from a associated point group associated as described above, and recognize the obtained affine transformation amount as a distortion amount.

It is to be noted that M in step 4 represents the number of segments detected from the template image. Also, the feature points in step 7 are end points or intersections of the segments. Also, the optimal value in step 6 represents that the degree of coincidence between arrangements of the feature points is the highest when the feature points of the template image or the reception image are transformed by a candidate affine transformation amount.

In this exemplary embodiment, first, a rough affine transformation amount is calculated from the pairs of segments detected from the template image and the reception image. The rough affine transformation amount is only required to create the pairs of feature points, and a more correct affine transformation amount is calculated from all pairs of feature points.

This exemplary embodiment does not hypothesize the distortion amount range. Instead of this, the pairs of segments of the template image and the reception image are limited, and hence the processing time is reduced.

A "likelihood of linearity" is generally considered to be higher as the shape is longer, thinner, and having less curve. Therefore, the technology of detecting a segment based on the likelihood of linearity generally detects a segment more correctly as the shape is longer and thinner. A segment detected from the reception image may be possibly incorrectly extracted or missed; however, it is expected that a segment is detected more correctly as the shape is longer. Hence, to attain an increase in speed without limiting the distortion amount, in this exemplary embodiment, narrowing is executed based on the lengths of segments.

Also, it is desirable to calculate an affine transformation amount from feature points being far from each other. This is because the influence of a very small error caused by detection may be reduced by the length of the segment. End points of a longer segment are more separated, and hence it is expected that a more correct affine transformation amount is calculated.

The detection of the segments in step 1 and step 2 may use an existing technology.

Also, the affine transformation amount in step 5 is calculated from the two pairs of segments. To obtain the affine transformation amount, at least three pairs of points are required. A pair of two segments includes at least three and at most five pairs of points, and desirable three pairs may be selected from the five pairs.

Also, there is an example of the optimal evaluation in step 6 as follows. First, the feature point coordinates of the template image are transformed by a candidate affine transformation amount. Then, pairs of feature points being the closest are created for the feature points of the reception image and the feature points of the template image after the transformation. Then, pairs of feature points at distances of a predetermined value or larger are rejected. Finally, the total number of pairs serves as an evaluation value. Alternatively, the inverse of the sum of distances of the pairs serves as an evaluation value.

Also, the affine transformation amount in step 8 is calculated from the pairs of feature points created as described above. To reduce the influence of noise caused by the detection of the feature points, for example, the affine transformation amount is obtained by using the least squares method.

Even if the reception image and the template image are switched in step 3 and step 4, similar effects are obtained. Also, in step 3, an abnormal value, such as when the segment is too short, the segment is too inclined, or the distance is too large, may be rejected. Also, in step 4, the segments of the template image may be narrowed in the order from a longer segment. In step 5, a pair that causes the affine transformation amount to be an abnormal value may be rejected, so that the processing in step 6 and later is reduced. In this case, an abnormal value represents an affine transformation amount indicative of enlargement/reduction or translation that is not physically expected in the actual environment, such as inversion.

Also, N and M to be selected in the above description may be set every document (every form). Also, N may be a value obtained by multiplying M by a predetermined coefficient of 1 or larger. This is because, although N is ideally equivalent to M, the number of segments of the reception image is generally larger than the number of segments of the template image.

The output device 130 is connected with the image processing apparatus 100. The output device 130 outputs the processing result by the image processing apparatus 100 (affine transformation amount 775, region image 1295, character recognition result 1395). For example, the output includes displaying the processing result on a display device such as a display, storing the processing result in a memory such as a hard disk, and giving the processing result to other information processing apparatus that uses the processing result.

FIG. 7 is a conceptual module configuration diagram of a configuration example of a first exemplary embodiment. FIG. 7 shows the content of the image processing apparatus 100 shown in the example of FIG. 1. The configuration includes a segment detection module 710, a segment selection module 720, a segment-pair selection module 730, a feature-point detection module 740, an affine-transformation-amount calculation A module 750, a feature-point-pair search module 760, and an affine-transformation-amount calculation B module 770.

The overview of the processing is similar to the processing of the above-described image processing apparatus 100. However, a segment or a feature point is not detected from the template image, but previously extracted information of a segment and a feature amount of a template is used.

The segment detection module 710 is connected with the segment selection module 720, receives a reception image 705, and gives reception-image segments 715 to the segment selection module 720. That is, the segment detection module 710 detects the reception-image segments 715 from the reception image 705.

The segment selection module 720 is connected with the segment detection module 710 and the segment-pair selection module 730, and gives reception-image segments 725 to the segment-pair selection module 730. The segment selection module 720 selects a predetermined number of segments counted from the higher priority in the order of length among the reception image segments 715, and gives the selected segments as the reception-image segments 725 to the segment-pair selection module 730. In this case, in "the order of length," a segment with a larger length has a higher priority. In other words, segments are sorted in descending order. That is, a number N of segments (reception-image segments 725) are selected from all detected segments (reception-image segments 715).

The segment-pair selection module 730 is connected with the segment selection module 720 and the affine-transformation-amount calculation A module 750, receives template segments 727, and gives segment pairs 735 to the affine-transformation-amount calculation A module 750. The segment-pair selection module 730 selects pairs of the reception-image segments 725 and the template segments 727. The template segments 727 are segments in a template image, which serves as a model of the reception image 705. That is, the segment-pair selection module 730 creates pairs of segments (segment pairs 735) in which the template segments 727 are associated with the reception-image segments 725.

The feature-point detection module 740 is connected with the affine-transformation-amount calculation A module 750 and the feature-point-pair search module 760, receives the reception image 705, and gives reception-image feature points 745 to the affine-transformation-amount calculation A module 750 and the feature-point-pair search module 760. The feature-point detection module 740 extracts feature points in the reception image 705 by using an existing technology, and outputs the feature points as the reception-image feature points 745. Herein, feature amounts are end points of segments, or intersections formed by segments.

The affine-transformation-amount calculation A module 750 is connected with the segment-pair selection module 730, the feature-point detection module 740, and the feature-point-pair search module 760, receives template feature points 777, and gives an affine transformation amount 755 to the feature-point-pair search module 760. The affine-transformation-amount calculation A module 750 uses the segment pairs 735, and calculates distortion of the reception image 705 with respect to the template image. That is, the affine-transformation-amount calculation A module 750 calculates the affine transformation amount 755 from two pairs of segments (segment pairs 735), and outputs the affine transformation amount 755 having the highest degree of coincidence between the reception-image feature points 745 and the template feature points 777. In this case, an affine transformation amount may be calculated from two segment pairs, and an affine transformation amount indicative of distortion may be selected based on the degree of coincidence between the reception image 705 using the previously calculated affine transformation amount and the template image. Herein, the degree of coincidence is a number of the pairs of the closest relationship arranged within a predetermined distance after the transformation by using the affine transformation amount, among the reception-image feature points 745 detected from the reception image 705 and the template feature points 777 of the template image.

The feature-point-pair search module 760 is connected with the feature-point detection module 740, the affine-transformation-amount calculation A module 750, and the affine-transformation-amount calculation B module 770, receives the template feature points 777, and gives feature-point pairs 765 to the affine-transformation-amount calculation B module 770. The feature-point-pair search module 760 associates the feature points and creates pairs of feature points (feature-point pairs 765) based on the affine transformation amount 755.

The affine-transformation-amount calculation B module 770 is connected with the feature-point-pair search module 760, and outputs an affine transformation amount 775. The affine-transformation-amount calculation B module 770 calculates the affine transformation amount 775 from the pairs of feature points (feature-point pairs 765). The affine transformation amount is calculated by using the least squares method from pairs of the closest relationship arranged within the predetermined distance after the calculation processing by the affine-transformation-amount calculation A module 750, among the reception-image feature points 745 of the reception image 705 and the template feature points 777 of the template image.

Figure 8A:
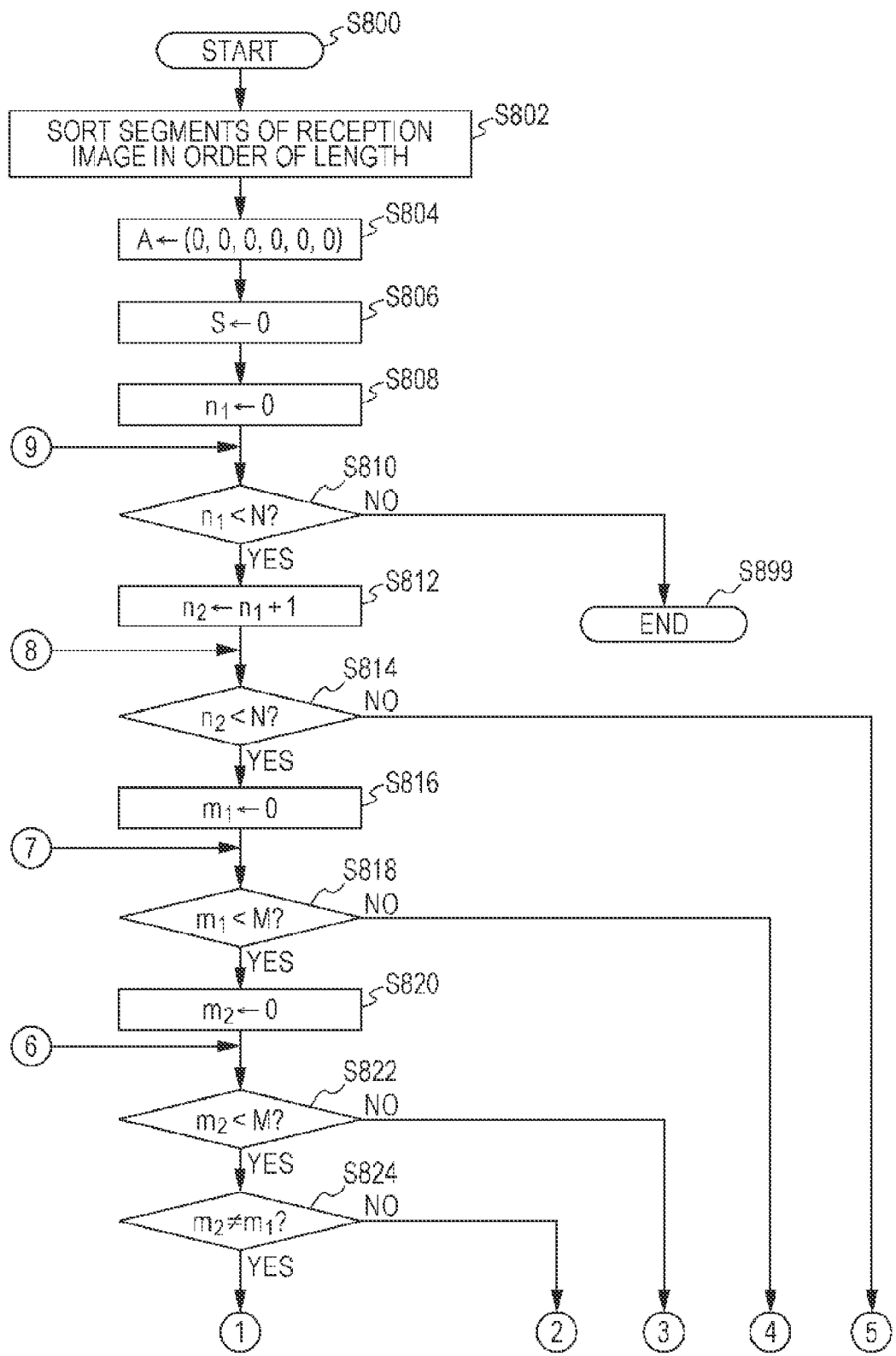
FIGS. 8A and 8B provide a flowchart showing a processing example according to the first exemplary embodiment.
Figure 8B:
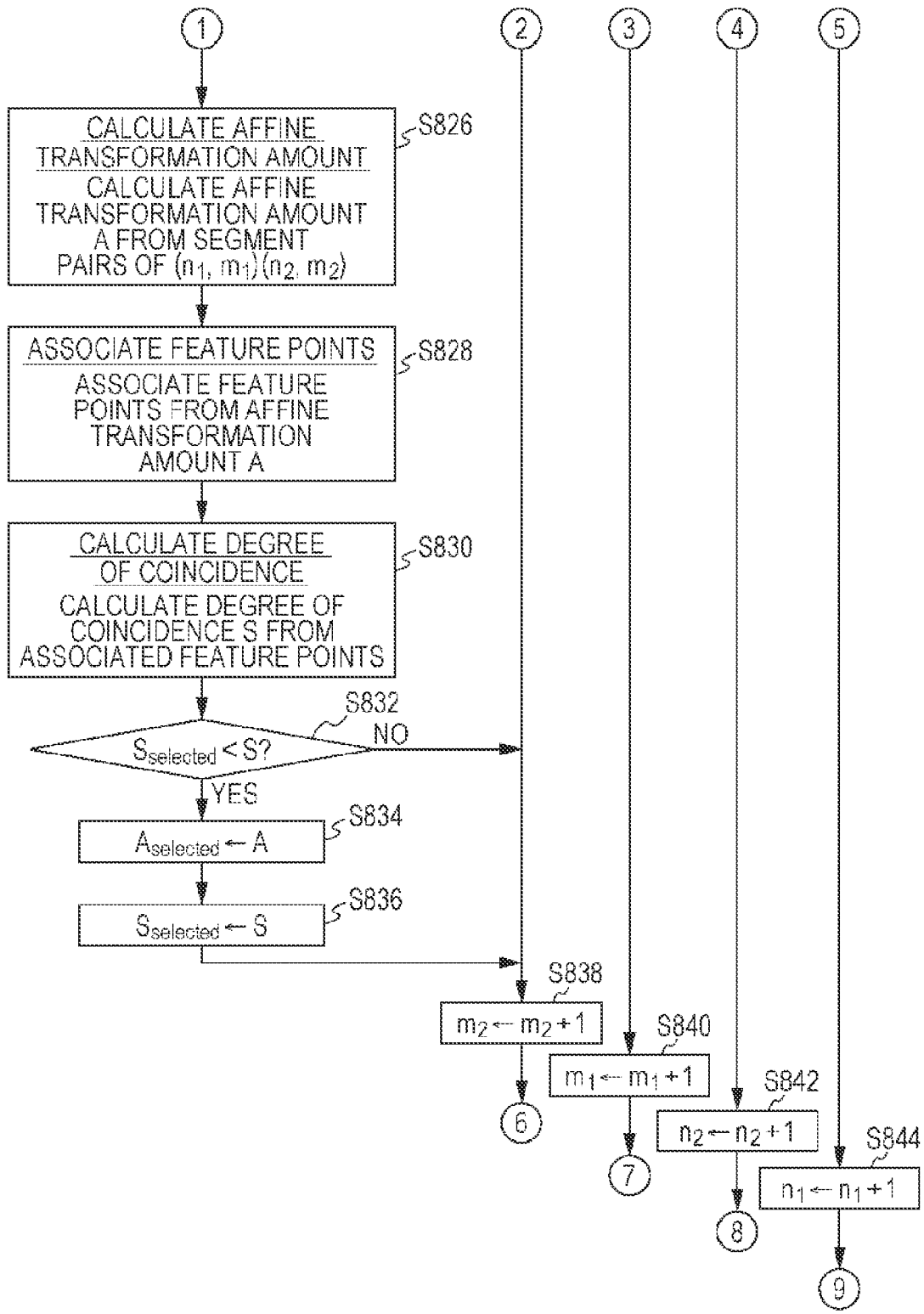

FIGS. 8A and 8B provide a flowchart showing a processing example according to the first exemplary embodiment. FIGS. 8A and 8B show an example of a processing flow in the segment-pair selection module 730 and the affine-transformation-amount calculation A module 750.

The segments of the reception image are sorted in the order of length, and only N segments with higher priorities are referenced. It is to be noted that $n_1$ and $n_2$ are each an index of a segment of the reception image. Also, $m_1$ and $m_2$ are each an index of a segment of the template. Also, an affine transformation amount A is six parameters (a, b, c, d, e, f) in aforementioned Expression 1.

Since an affine transformation amount serving as a distortion amount is obtained, if arrangement in an abnormal posture is found when a large amount of scanning is executed, the abnormal posture may be automatically detected and notified.

In step S802, segments of a reception image are sorted in the order of length.

In step S804, (0, 0, 0, 0, 0, 0) is substituted into an affine transformation amount A.

In step S806, 0 is substituted into a variable S.

In step S808, 0 is substituted into a variable $n_1$.

In step S810, it is determined whether $n_1 < N$ or not. If $n_1 < N$, the processing goes to step S812, and otherwise, the processing is ended (step S899).

In step S812, $n_1+1$ is substituted into a variable $n_2$.

In step S814, it is determined whether $n_2<N$ or not. If $n_2<N$, the processing goes to step S816, and otherwise, the processing goes to step S844.

In step S816, 0 is substituted into a variable $m_1$.

In step S818, it is determined whether $m_1<M$ or not. If $m_1<M$, the processing goes to step S820, and otherwise, the processing goes to step S842.

In step S820, 0 is substituted into a variable $m_2$.

In step S822, it is determined whether $m_2<M$ or not. If $m_2<M$, the processing goes to step S824, and otherwise, the processing goes to step S840.

In step S824, it is determined whether $m_2 \neq m_1$ or not. If $m_2 \neq m_1$, the processing goes to step S826, and otherwise, the processing goes to step S838.

In step S826, an affine transformation amount is calculated. The affine transformation amount A is calculated from segment pairs of $(n_1, m_1)$ and $(n_2, m_2)$.

In step S828, feature points are associated. The feature points are associated by using the affine transformation amount A.

In step S830, the degree of coincidence is calculated. The degree of coincidence S is calculated by using the associated feature points.

In step S832, it is determined whether $S_{selected}<S$ or not. If $S_{selected}<S$, the processing goes to step S834, and otherwise, the processing goes to step S838.

In step S834, A is substituted into $A_{selected}$.

In step S836, S is substituted into $S_{selected}$.

In step S838, $m_2+1$ is substituted into $m_2$.

In step S840, $m_1+1$ is substituted into $m_1$.

In step S842, $n_2+1$ is substituted into $n_2$.

In step S844, $n_1+1$ is substituted into $n_1$.

Figure 9:
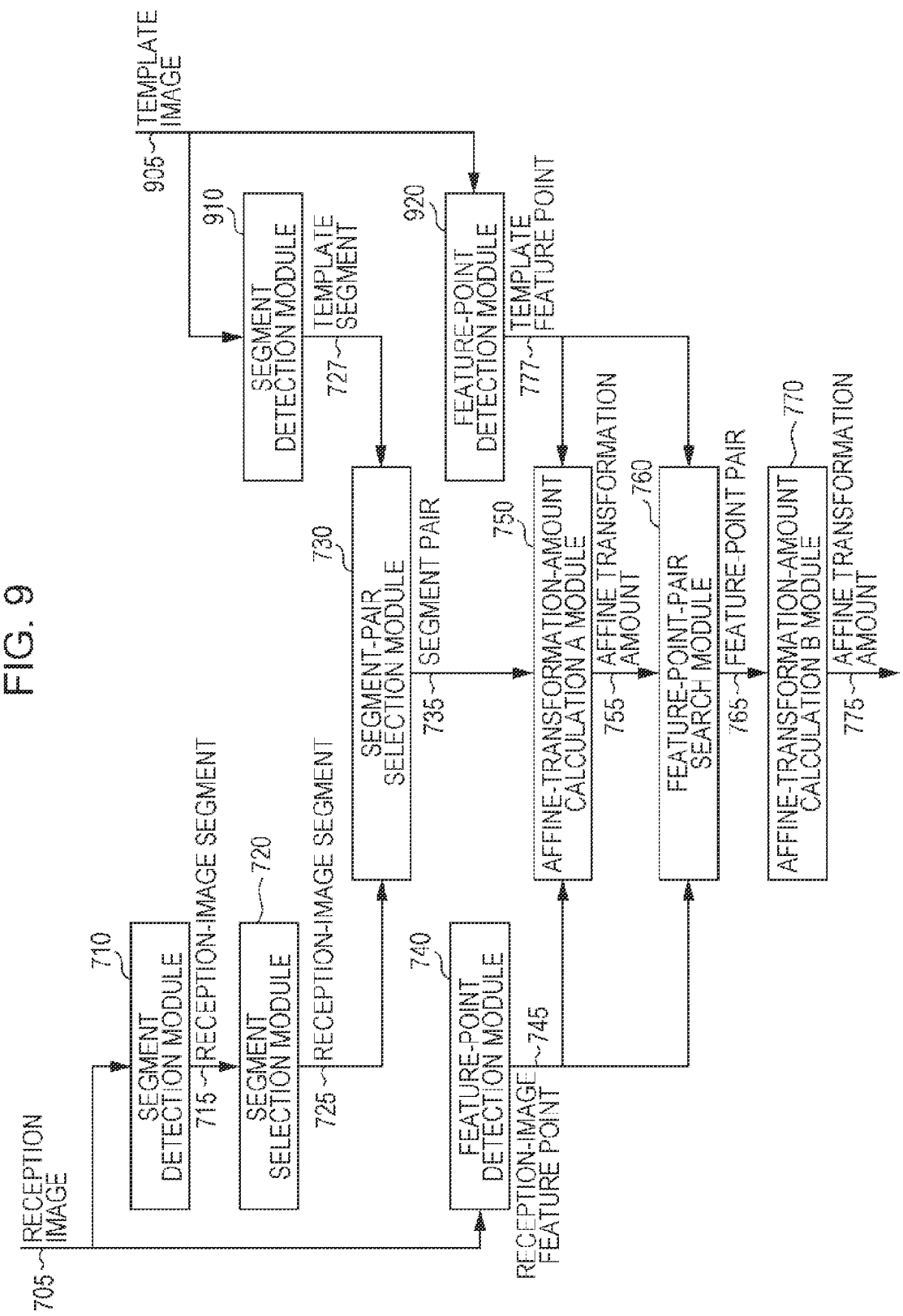
FIG. 9 is a conceptual module configuration diagram of a configuration example of a second exemplary embodiment.

FIG. 9 is a conceptual module configuration diagram of a configuration example of a second exemplary embodiment. An image processing apparatus 100 according to the second exemplary embodiment includes a segment detection module 710, a segment selection module 720, a segment-pair selection module 730, a feature-point detection module 740, an affine-transformation-amount calculation A module 750, a feature-point-pair search module 760, an affine-transformation-amount calculation B module 770, a segment detection module 910, and a feature-point detection module 920. The same reference sign is applied to the same type of portion as that of the first exemplary embodiment, and the redundant description is omitted (the same will be applied to the following description). In the second exemplary embodiment, a template image is input.

If a template image 905 is created by a process of scanning or copying like a reception image 705, the reception image 705 and the template image 905 may have similar deterioration. Hence, the segments and feature points are required to be associated with higher degrees of coincidence with regard to incorrect detection and missing of a segment.

The segment-pair selection module 730 is connected with the segment selection module 720, the affine-transformation-amount calculation A module 750, and the segment detection module 910, and gives segment pairs 735 to the affine-transformation-amount calculation A module 750.

The affine-transformation-amount calculation A module 750 is connected with the segment-pair selection module 730, the feature-point detection module 740, the feature-point-pair search module 760, and the feature-point detection module 920, and gives an affine transformation amount 755 to the feature-point-pair search module 760.

The feature-point-pair search module 760 is connected with the feature-point detection module 740, the affine-transformation-amount calculation A module 750, the affine-transformation-amount calculation B module 770, and the feature-point detection module 920, and gives feature-point pairs 765 to the affine-transformation-amount calculation B module 770.

The segment detection module 910 is connected with the segment-pair selection module 730, receives the template image 905, and gives template segments 727 to the segment-pair selection module 730. The segment detection module 910 detects the template segments 727 from the template image 905. Herein, in the template image 905, a frame indicative of layout information is drawn, and an area within the frame is a non-written image. That is, the image is the reception image 705 before writing. Processing equivalent to that of the segment detection module 710 is executed.

The feature-point detection module 920 is connected with the affine-transformation-amount calculation A module 750 and the feature-point-pair search module 760, receives the template image 905, and gives template feature points 777 to the affine-transformation-amount calculation A module 750 and the feature-point-pair search module 760. Processing equivalent to that of the feature-point detection module 740 is executed.

Figure 10:
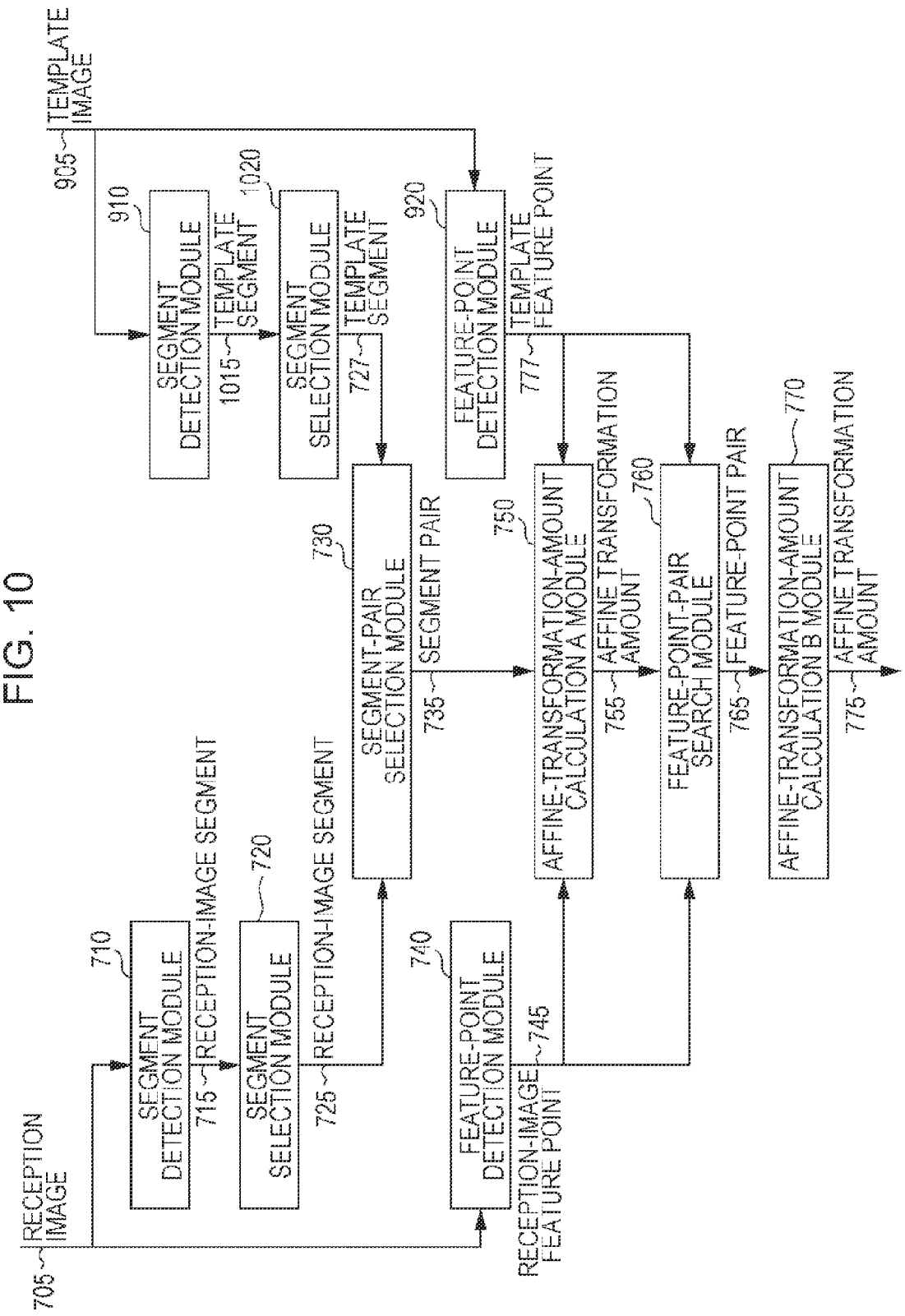
FIG. 10 is a conceptual module configuration diagram of a configuration example of a third exemplary embodiment.

FIG. 10 is a conceptual module configuration diagram of a configuration example of a third exemplary embodiment. An image processing apparatus 100 according to the third exemplary embodiment includes a segment detection module 710, a segment selection module 720, a segment-pair selection module 730, a feature-point detection module 740, an affine-transformation-amount calculation A module 750, a feature-point-pair search module 760, an affine-transformation-amount calculation B module 770, a segment detection module 910, a feature-point detection module 920, and a segment selection module 1020. This is an example of selecting a template segment.

The segment-pair selection module 730 is connected with the segment selection module 720, the affine-transformation-amount calculation A module 750, and the segment selection module 1020, and gives segment pairs 735 to the affine-transformation-amount calculation A module 750.

The segment detection module 910 is connected with the segment selection module 1020, receives a template image 905, and gives template segments 1015 to the segment selection module 1020.

The segment selection module 1020 is connected with the segment detection module 910 and the segment-pair selection module 730, and gives template segments 727 to the segment-pair selection module 730. The segment selection module 1020 uses a predetermined number of segments counted from the higher priority in the order of length, as the template segments 1015 of the template image 905. That is, segments with larger lengths are selected from the template segments 1015, and outputs the selected segments as the template segments 727. Selection is made based on the length even for the template segments 1015, and processing equivalent to the segment selection module 720 is executed.

Figure 11:
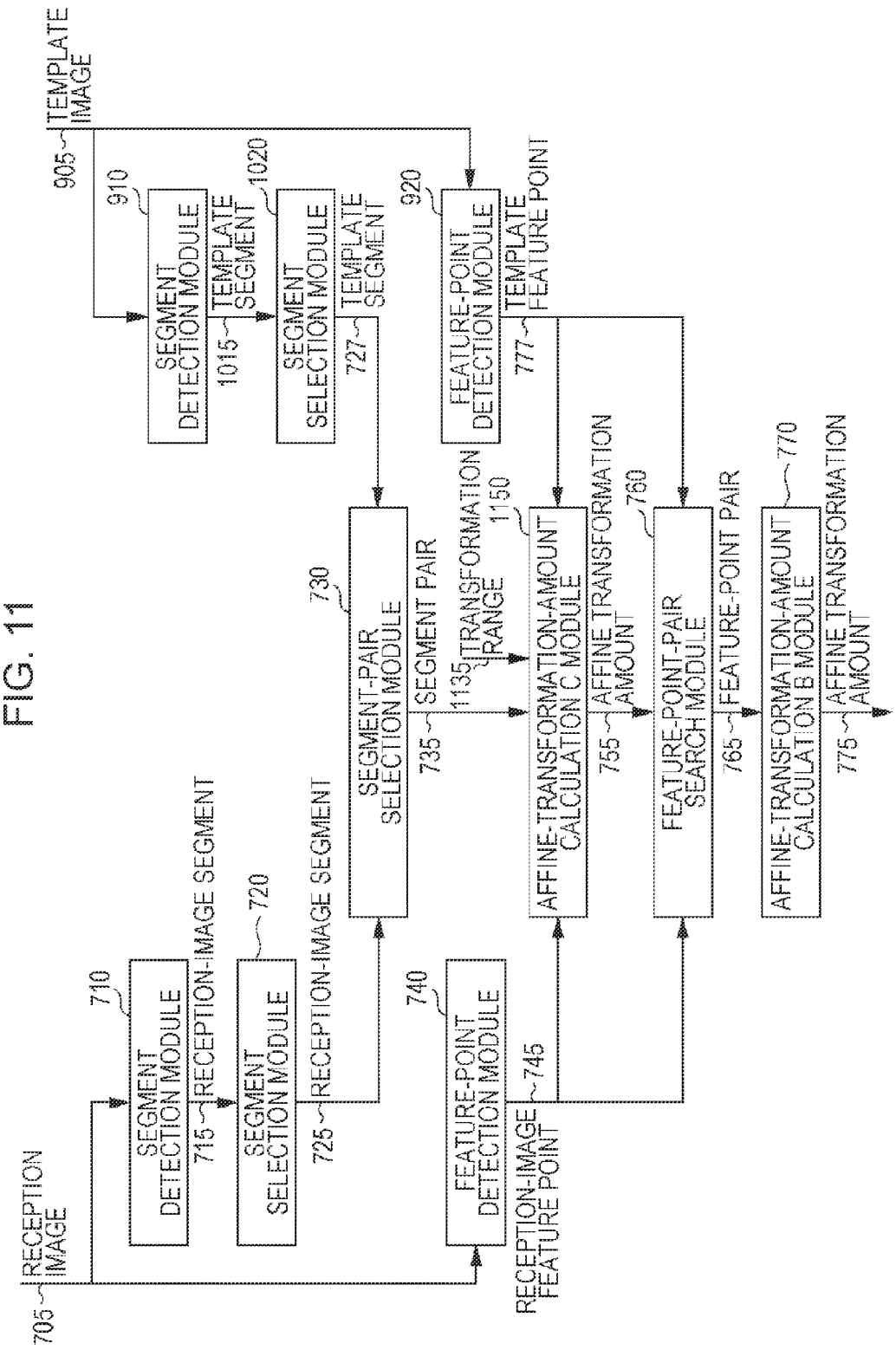
FIG. 11 is a conceptual module configuration diagram of a configuration example of a fourth exemplary embodiment.

FIG. 11 is a conceptual module configuration diagram of a configuration example of a fourth exemplary embodiment. An image processing apparatus 100 according to the fourth exemplary embodiment includes a segment detection module 710, a segment selection module 720, a segment-pair selection module 730, a feature-point detection module 740, an affine-transformation-amount calculation A module 750, a feature-point-pair search module 760, an affine-transformation-amount calculation B module 770, a segment detection module 910, a feature-point detection module 920, a segment selection module 1020, and an affine-transformation-amount calculation C module 1150. This is an example of rejecting a pair of abnormal segments.

The segment-pair selection module 730 is connected with the segment selection module 720, the segment selection module 1020, and the affine-transformation-amount calculation C module 1150, and gives segment pairs 735 to the affine-transformation-amount calculation C module 1150.

The affine-transformation-amount calculation C module 1150 is connected with the segment-pair selection module 730, the feature-point detection module 740, the feature-point-pair search module 760, and the feature-point detection module 920, receives a transformation range 1135, and gives an affine transformation amount 755 to the feature-point-pair search module 760. The affine-transformation-amount calculation C module 1150 does not search a pair of feature points for evaluation of the degree of coincidence if the affine transformation amount calculated from the segment pairs 735 is an abnormal value. That is, the affine-transformation-amount calculation C module 1150 determines an affine transformation amount, which is not within the transformation range 1135, as an abnormal value, and rejects the affine transformation amount before the degree of coincidence is evaluated for the feature points. The affine transformation amount may be rejected immediately before the processing of associating feature points (step S828) in the flowchart example shown in FIGS. 8A and 8B.

The feature-point-pair search module 760 is connected with the feature-point detection module 740, the affine-transformation-amount calculation C module 1150, the affine-transformation-amount calculation B module 770, and the feature-point detection module 920, and gives feature-point pairs 765 to the affine-transformation-amount calculation B module 770.

Figure 12:
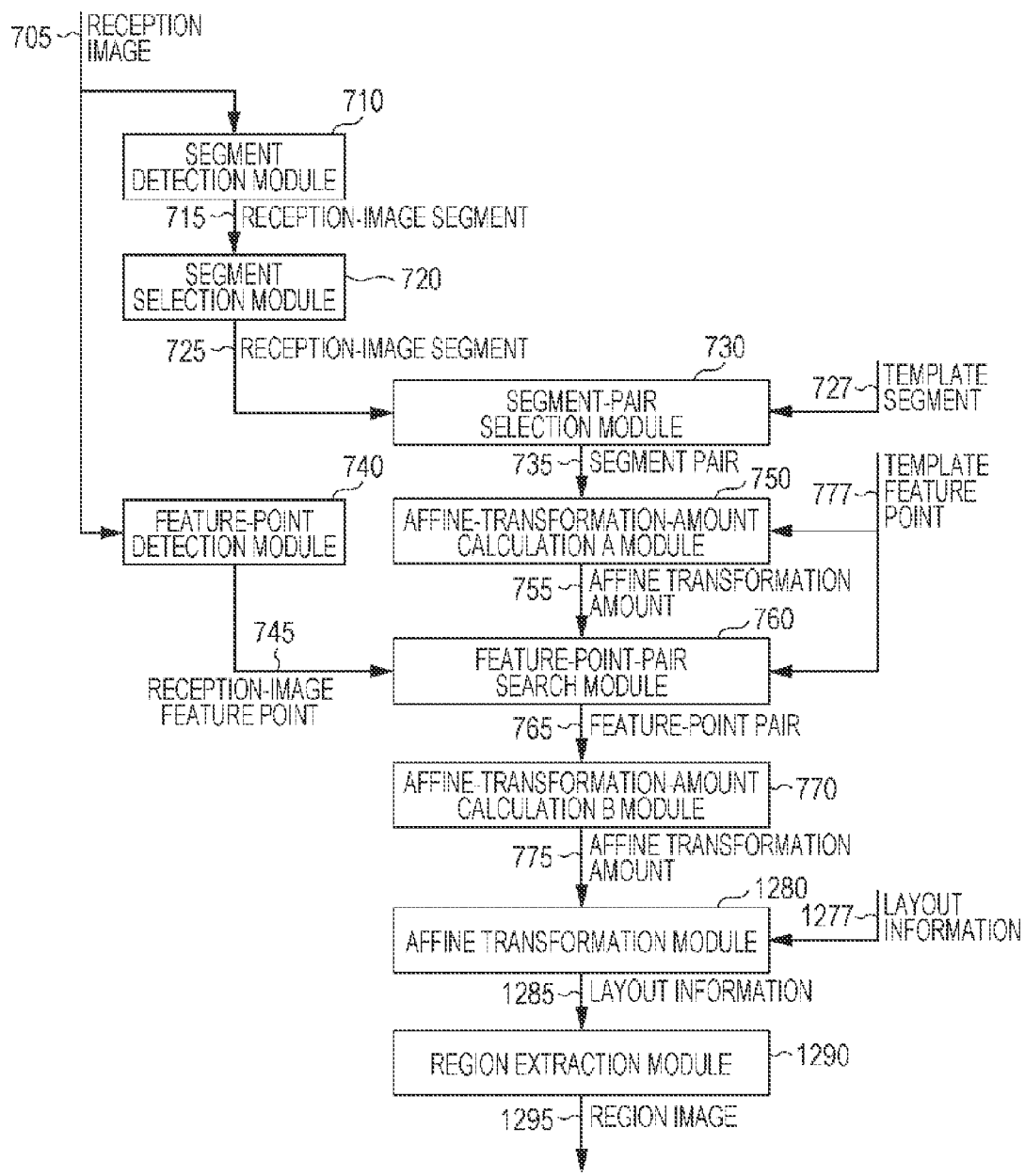
FIG. 12 is a conceptual module configuration diagram of a configuration example of a fifth exemplary embodiment.

FIG. 12 is a conceptual module configuration diagram of a configuration example of a fifth exemplary embodiment. An image processing apparatus 100 according to the fifth exemplary embodiment includes a segment detection module 710, a segment selection module 720, a segment-pair selection module 730, a feature-point detection module 740, an affine-transformation-amount calculation A module 750, a feature-point-pair search module 760, an affine-transformation-amount calculation B module 770, an affine transformation module 1280, and a region extraction module 1290. This is an example of correcting layout information.

The affine-transformation-amount calculation B module 770 is connected with the feature-point-pair search module 760 and the affine transformation module 1280, and gives an affine transformation amount 775 to the affine transformation module 1280.

The affine transformation module 1280 is connected with the affine-transformation-amount calculation B module 770 and the region extraction module 1290, receives layout information 1277, and gives layout information 1285 to the region extraction module 1290. The affine transformation module 1280 corrects position information of the layout information 1277 by using the affine transformation amount 775 calculated by the affine-transformation-amount calculation B module 770. The correction is as written in Expression 1. Thus, the layout information 1285, in which the distortion generated in the actual environment is corrected, is obtained.

The region extraction module 1290 is connected with the affine transformation module 1280, receives the layout information 1285, and outputs a region image 1295. That is, by extracting the region based on the corrected layout information 1285, the region image 1295 (written information) of a desirable position is obtained. Since the layout information 1285 is corrected instead of the reception image 705, an error caused by image edition is not present, and the number of points to be corrected is reduced.

Figure 13:
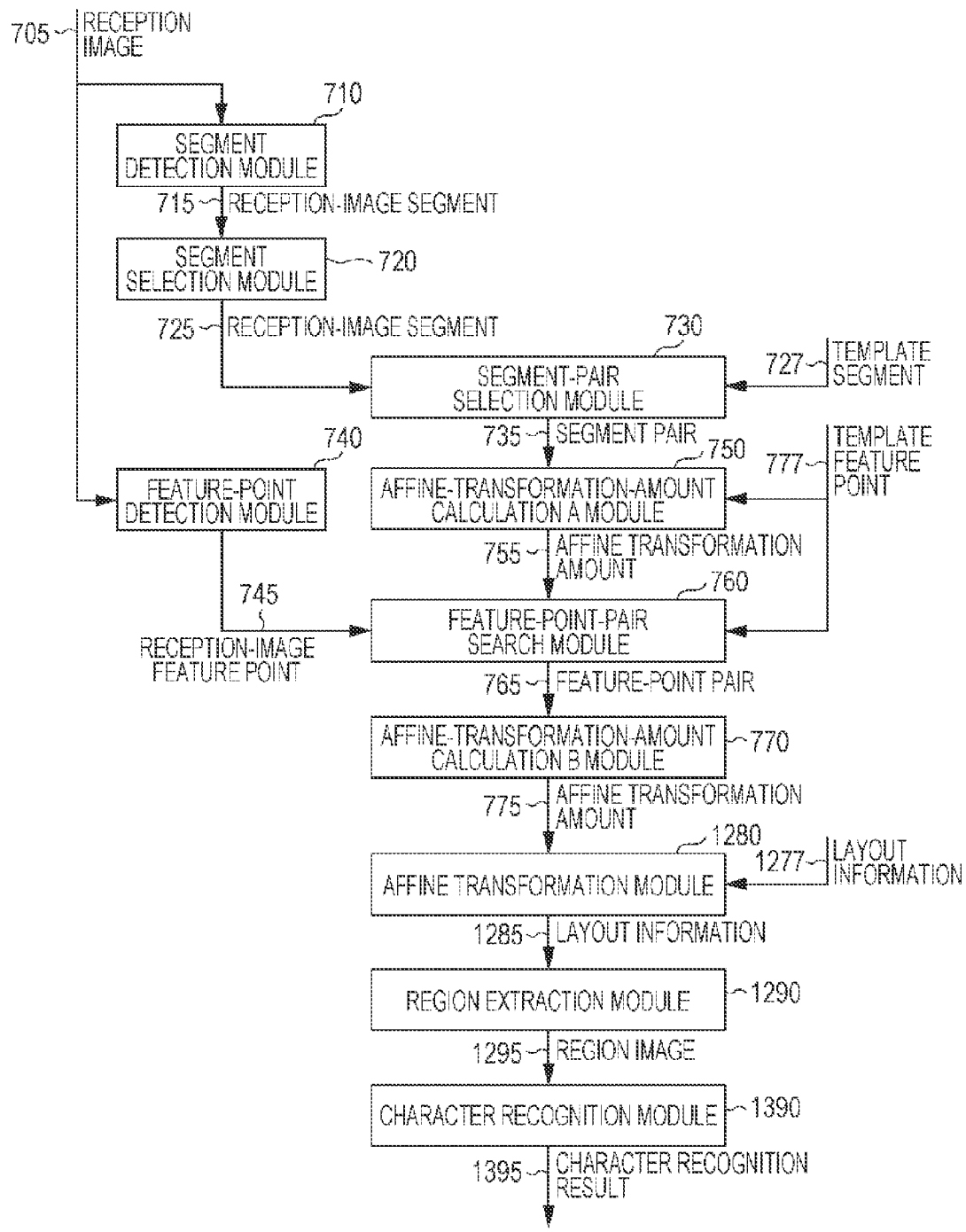
FIG. 13 is a conceptual module configuration diagram of a configuration example of a sixth exemplary embodiment.

FIG. 13 is a conceptual module configuration diagram of a configuration example of a sixth exemplary embodiment. An image processing apparatus 100 according to the sixth exemplary embodiment includes a segment detection module 710, a segment selection module 720, a segment-pair selection module 730, a feature-point detection module 740, an affine-transformation-amount calculation A module 750, a feature-point-pair search module 760, an affine-transformation-amount calculation B module 770, an affine transformation module 1280, a region extraction module 1290, and a character recognition module 1390. This is an example of recognizing a character.

The region extraction module 1290 is connected with the affine transformation module 1280 and the character recognition module 1390, and gives a region image 1295 to the character recognition module 1390.

The character recognition module 1390 is connected with the region extraction module 1290, and outputs a character recognition result 1395. The character recognition module 1390 recognizes a character based on corrected layout information 1285. That is, the character recognition module 1390 executes character recognition on the region image 1295, and outputs the character recognition result 1395. The character recognition may use an existing technology.

In the examples shown in FIGS. 12 and 13, the modules (affine transformation module 1280, region extraction module 1290, character recognition module 1390) are added to the first exemplary embodiment. Alternatively, the modules may be similarly added to the second exemplary embodiment.

A hardware configuration example of the image processing apparatus according to an exemplary embodiment is described with reference to FIG. 14. The configuration shown in FIG. 14 is formed of, for example, a personal computer (PC), and includes a data reading unit 1417 such as a scanner, and a data output unit 1418 such as a printer.

A central processing unit (CPU) 1401 is a controller that executes processing according to a computer program having written therein an execution sequence of each of various modules described in the aforementioned exemplary embodiments, i.e., the segment detection module 710, the segment selection module 720, the segment-pair selection module 730, the feature-point detection module 740, the affine-transformation-amount calculation A module 750, the feature-point-pair search module 760, the affine-transformation-amount calculation B module 770, the segment detection module 910, the feature-point detection module 920, the segment selection module 1020, the affine-transformation-amount calculation C module 1150, the affine transformation module 1280, the region extraction module 1290, and the character recognition module 1390.

A read only memory (ROM) 1402 stores, for example, a program and a calculation parameter used by the CPU 1401. A random access memory (RAM) 1403 stores, for example, a program to be used during execution of the CPU 1401, and a parameter that is properly changed during the execution. These are mutually connected through a host bus 1404 formed of, for example, a CPU bus.

The host bus 1404 is connected with an external bus 1406 such as a peripheral component interconnect/interface (PCI) bus through a bridge 1405.

A keyboard 1408, and a pointing device 1409 such as a mouse are input devices operated by an operator. A display 1410 is, for example, a liquid crystal display device or a cathode ray tube (CRT). The display 1410 displays various information as text or image information.

A hard disk drive (HDD) 1411 includes a hard disk, and drives the hard disk, to cause the hard disk to record or reproduce a program executed by the CPU 1401 and information. The hard disk stores the reception image 705, the template segment 727, the template feature point 777, the affine transformation amount 775, the region image 1295, the character recognition result 1395, and so forth. Further, the hard disk stores various computer programs such as other various data processing program.

A drive 1412 reads data or a program stored in a removable storage medium 1413, such as a magnetic disk, an optical disk, a magneto-optical disk, or a semiconductor memory, mounted thereon, and supplies the data or program to the RAM 1403 through an interface 1407, the external bus 1406, the bridge 1405, and the host bus 1404. The removable storage medium 1413 may be used as a data storage region similarly to the hard disk.

A connection port 1414 is a port for connection with an external connection device 1415, and has a connection portion such as USB or IEEE 1394. The connection port 1414 is connected with the CPU 1401 and so forth through the interface 1407, the external bus 1406, the bridge 1405, the host bus 1404, and so forth. A communication unit 1416 is connected with a communication line, and executes data communication processing with an external device. A data reading unit 1417 is, for example, a scanner, and executes reading processing of a document. A data output unit 1418 is, for example, a printer, and executes output processing of document data.

The hardware configuration of the image processing apparatus shown in FIG. 14 merely shows a single configuration example. The exemplary embodiments are not limited to the configuration shown in FIG. 14, and may have any configuration as long as the configuration is able to execute the modules described in the exemplary embodiments. For example, a partial module may be formed of dedicated hardware (for example, application specific integrated circuit (ASIC) etc.), or a partial module may be arranged in an external system and may be connected through a communication line. Further, the system shown in FIG. 14 may be plural systems, the systems may be connected through a communication line, and the systems may be operated in an associated manner. Also, a partial module may be incorporated in a copier, a facsimile, a scanner, a printer, or a multifunction device (image processing apparatus having at least two functions of a scanner, a printer, a copier, and a facsimile).

The described program may be stored in a storage medium and may be provided, or the program may be provided through a communication portion. In this case, for example, the above-described program may be considered as the invention of "a computer-readable storage medium storing a program."

"The computer-readable storage medium storing the program" represents a computer-readable storage medium storing a program that is used for installing the program, executing the program, and distributing the program.

The storage medium may include, for example, a digital versatile disk (DVD), such as "DVD-R, DVD-RW, DVD-RAM, etc." meeting the standard determined by the DVD forum and "DVD+R, DVD+RW, etc." meeting the standard of DVD+RW; a compact disc (CD), such as a CD-read-only memory (CD-ROM), a CD-recordable (CD-R), a CD-rewritable (CD-RW), etc.; a Blu-ray Disc (registered trademark); a magneto-optical disk (MO); a flexible disk (FD); a magnetic tape; a hard disk; a read-only memory (ROM); an electrically erasable programmable read-only memory (EEPROM (registered trademark)); a flash memory; a random access memory (RAM); and a secure digital (SD) memory card.

The above-described program or part of the program may be stored on the storage medium, and may be saved or distributed. Also, the program may be transmitted by communication through a transmission medium, such as a wired network or a wireless network used for a local area network (LAN), a metropolitan area network (MAN), a wide area network (WAN), the Internet, an intranet, an extranet, etc., or a combination of these networks. Alternatively, the program may be carried on a carrier wave.

Further, the above-described program may be part of other program, or may be recorded on a storage medium together with a different program. Alternatively, the program may be divided and recorded in plural storage media. Also, the program may be recorded in any form, for example, in a compressed or encrypted manner, as long as the program may be decompressed or decrypted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor configured to execute:
a detection unit configured to detect segments from a first image;
a sorting unit configured sort and prioritize the detected segments based on an order of length, wherein a longer segment has a higher priority than a shorter segment;
a selection unit configured to select pairs of segments formed of a predetermined number of segments counted from a higher priority in the order of the length among the sorted and prioritized detected segments and segments in a second image, the second image being a model of the first image;
a calculation unit configured to calculate distortion of the first image with respect to the second image by using the pairs of segments; and
a correction unit configured to correct layout information by using an affine transformation amount determined based on a degree of coincidence between the first image and the second image, the degree of coincidence being a number of pairs of the closest relationship arranged within a predetermined distance among feature points detected from the first image and feature points in the second image.

2. The image processing apparatus according to claim 1, wherein the calculation unit is further configured to:
calculate one or more affine transformation amounts from any two of the pairs of segments, and
select the affine transformation amount, among the two or more affine transformation amounts, indicative of the distortion based on the degree of coincidence between the first image and the second image determined using the calculated one or more affine transformation amounts.

3. The image processing apparatus according to claim 2, wherein the feature points are end points of the segments or intersections formed by the segments.

4. The image processing apparatus according to claim 1, wherein the processor is further configured to execute:
a second calculation unit configured to calculate the affine transformation amount by a least squares method from pairs of the closest relationship arranged within the predetermined distance after the calculation processing by the calculation unit, among feature points of the first image and feature points of the second image.

5. The image processing apparatus according to claim 1, wherein the processor is further configured to execute: a second detection unit configured to detect segments from the second image,
wherein, in the second image, a frame indicative of layout information is drawn, and an area within the frame is a non-written image.

6. The image processing apparatus according to claim 1, wherein the selection unit is further configured to use a predetermined number of segments counted from the higher priority in the order of length as the segments of the second image.

7. The image processing apparatus according to claim 2, wherein the calculation unit is configured not to search a pair of feature points for evaluation of the degree of coincidence if the affine transformation amount calculated from the pairs of segments is an abnormal value.

8. The image processing apparatus according to claim 1, wherein the processor is further configured to execute:
a character recognition unit configured to recognize a character based on the corrected layout information.

9. An image processing method comprising:
detecting segments from a first image;
sorting and prioritizing the detected segments based on an order of length, wherein a longer segment has a higher priority than a shorter segment;
selecting pairs of segments formed of a predetermined number of segments counted from a higher priority in the order of the length among the sorted and prioritized detected segments and segments in a second image, the second image being a model of the first image;
calculating distortion of the first image with respect to the second image by using the pairs of segments; and
correcting layout information by using an affine transformation amount determined based on a degree of coincidence between the first image and the second image, the degree of coincidence being a number of pairs of the closest relationship arranged within a predetermined distance among feature points detected from the first image and feature points in the second image.

10. A non-transitory computer readable medium storing a program causing a computer to execute a process for image processing, the process comprising:
detecting segments from a first image;
sorting and prioritizing the detected segments based on an order of length, wherein a longer segment has a higher priority than a shorter segment;
selecting pairs of segments formed of a predetermined number of segments counted from a higher priority in the order of the length among the sorted and prioritized detected segments and segments in a second image, the second image being a model of the first image;
calculating distortion of the first image with respect to the second image by using the pairs of segments; and
correcting layout information by using an affine transformation amount determined based on a degree of coincidence between the first image and the second image, the degree of coincidence being a number of pairs of the closest relationship arranged within a predetermined distance among feature points detected from the first image and feature points in the second image.

* * * * *